US011760031B1

(12) United States Patent
Nagel

(10) Patent No.: US 11,760,031 B1
(45) Date of Patent: Sep. 19, 2023

(54) RAPID MANUFACTURING SYSTEM AND METHOD

(71) Applicant: Valerie Nagel, Tiffin, OH (US)

(72) Inventor: Valerie Nagel, Tiffin, OH (US)

( * ) Notice: Subject to any disclaimer, the term of this patent is extended or adjusted under 35 U.S.C. 154(b) by 316 days.

(21) Appl. No.: 16/903,587

(22) Filed: Jun. 17, 2020

Related U.S. Application Data

(60) Provisional application No. 62/862,398, filed on Jun. 17, 2019.

(51) Int. Cl.
*B29C 64/40* (2017.01)
*B23H 1/00* (2006.01)
*B33Y 30/00* (2015.01)
*B33Y 40/20* (2020.01)

(52) U.S. Cl.
CPC ........... *B29C 64/40* (2017.08); *B23H 1/00* (2013.01); *B33Y 30/00* (2014.12); *B33Y 40/20* (2020.01)

(58) Field of Classification Search
CPC ........ B29C 64/245; B29C 64/40; B33Y 30/00; B33Y 40/20; B23H 1/00
See application file for complete search history.

(56) References Cited

U.S. PATENT DOCUMENTS

| 4,098,652 A | 7/1978 | Koenig | |
|---|---|---|---|
| 2012/0067501 A1* | 3/2012 | Lyons | B29C 64/35 156/359 |
| 2013/0043218 A1 | 2/2013 | Lancaster-Larocque et al. | |
| 2018/0117854 A1* | 5/2018 | Hart et al. | B22F 12/00 |

FOREIGN PATENT DOCUMENTS

| JP | S5984962 A | 5/1984 |
|---|---|---|
| JP | S59169715 A | 9/1984 |
| RU | 2562558 C2* | 9/2015 |

OTHER PUBLICATIONS

Mitee-Grip™, https://www.miteebite.com/products/miteegrip/.
Practical Machinist Topic - discussing work holding with wax, https://www.practicalmachinist.com/vb/edmmachining/workholding-wax-our-futurewire-edm-298098/.
Translation of RU-2562558-C2, Sep. 2015, Russia, Klementev A N. (Year: 2015).*

* cited by examiner

*Primary Examiner* — George R Koch
(74) *Attorney, Agent, or Firm* — Jacob M. Ward; Ward Law Office LLC

(57) ABSTRACT

A support assembly for wire EDM includes a build plate, a temporary support, and at least one layer of a support material. The build plate has a body. The body has at least one additive manufactured part disposed on the body. The temporary support is removably disposed on the build plate. The temporary support has a hollow body defined by a plurality of sidewalls. The plurality of sidewalls have a plurality of apertures. The at least one layer of the support material is disposed on the build plate and the temporary support. The at least one layer of support material is a conductive wax material. The at least one layer of support material is configured to be melted and reused in subsequent wire EDM processes.

14 Claims, 11 Drawing Sheets

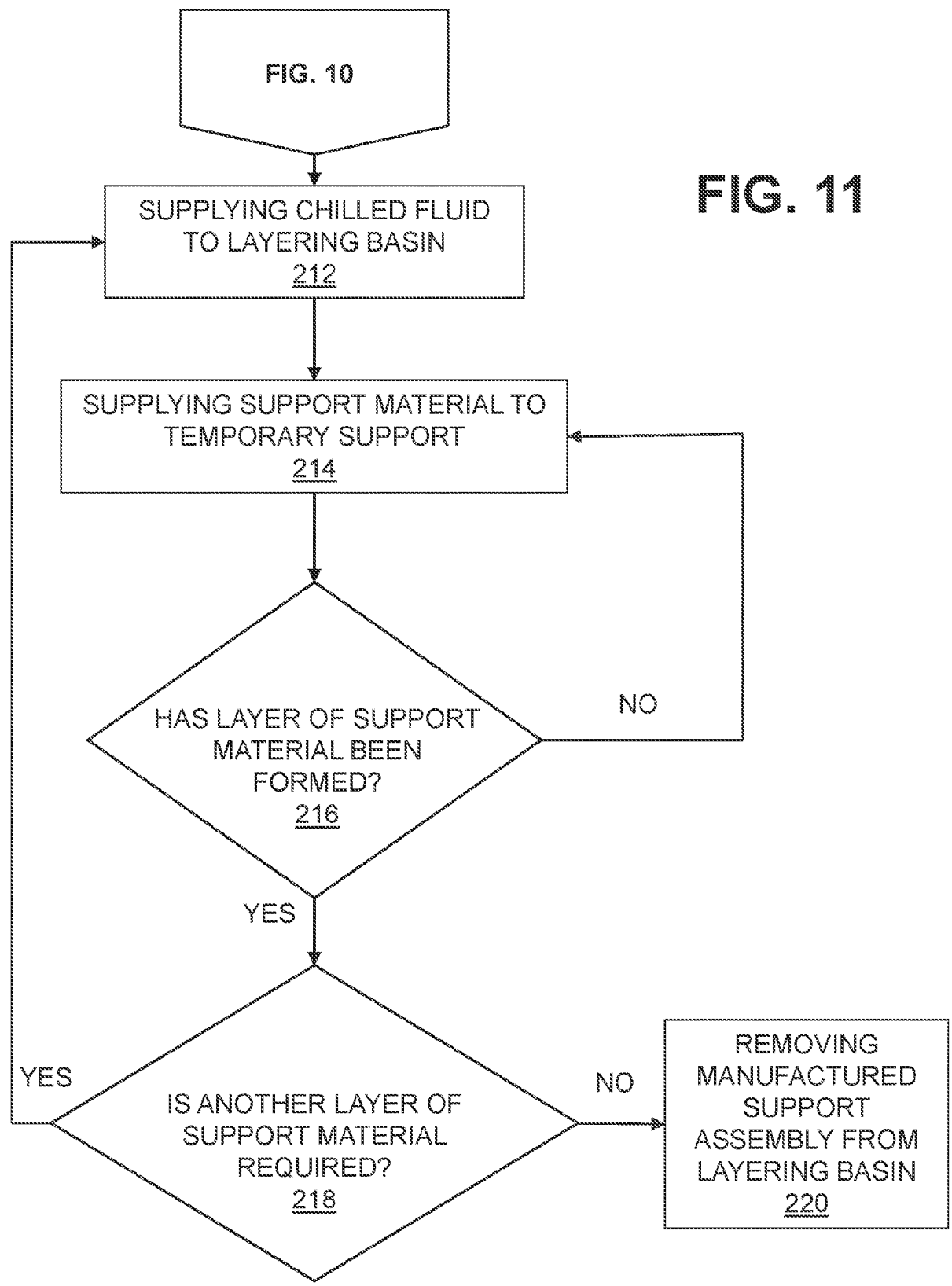

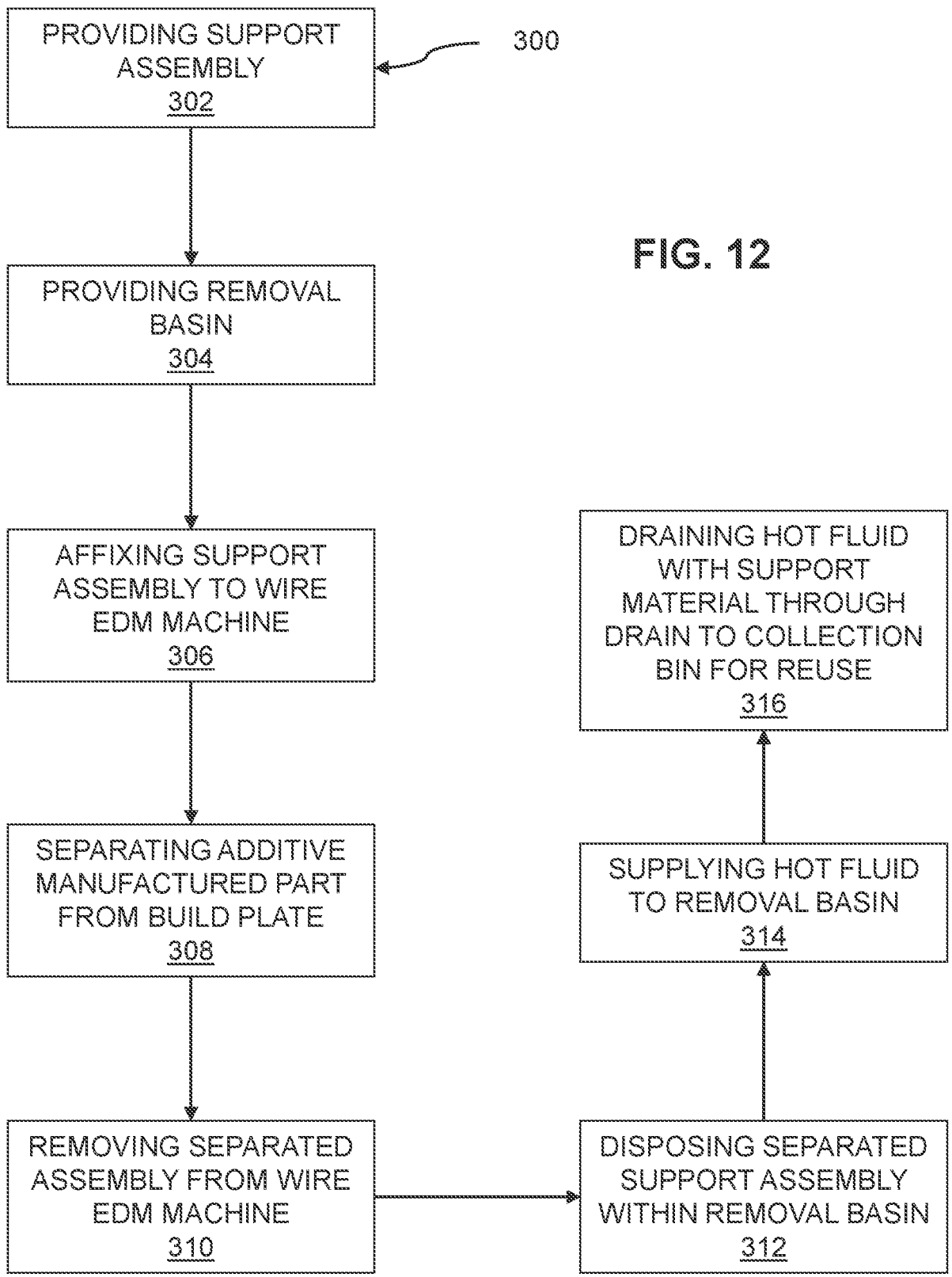

RAPID MANUFACTURING SYSTEM AND METHOD

CROSS REFERENCE TO RELATED APPLICATIONS

This application claims the benefit of U.S. Provisional Application Serial No. 62/862,398, filed on Jun. 17, 2019. The entire disclosure of the above application is hereby incorporated herein by reference.

FIELD

The disclosure generally relates to wire electrical discharge machining in additive manufacturing and, more specifically, a system and method for liberating individual parts from a build plate resulting from direct laser sintering.

BACKGROUND

Direct laser metal sintering (DLMS) is a process by which small amounts of powdered metal are "printed" with a laser beam on a base (build) plate and grown layer by layer to produce finished and complex three-dimensional parts.

Typically, after the printing is complete, parts are liberated from the build plate by either "band sawing" or by wire electrical discharge machining (EDM) while the baseplate is held vertically. This allows the parts to fall vertically into a collection receptacle. Band sawing is not a preferred method, generally, because it has limitations in accuracy, surface quality, and possible part damage.

Furthermore, the liberation of parts by wire EDM has five unique difficulties in this machining application. First, the parts are not held firmly before their removal from the base plate. This can cause "short circuits" that stop the EDM process or can cause the wire to break which requires operator intervention. A further consequence of the parts falling is the final EDM sizing and finishing process cannot be performed.

Second, parts liberated by wire EDM are often left with a small "tab" of material. These tabs must be removed in a secondary operation, which is inefficient, time-consuming, and can be costly.

Fourth, the parts may be damaged where they fall from being cut. This may also damage the machine itself from the impact of the parts.

Fifth, the parts may jam the lower arm of the wire EDM. Jams may possibly shut the entire machine down, stopping production entirely. Also, the parts may be damaged by the lower arm of the machine by crushing them where the lower arm moves during machining.

There is a continuing need for a system and method for using wire EDM to liberate parts that minimizes the opportunity for short circuits, eliminates the need for post-operation machining to remove tabs, minimizes damage to parts and the wire EDM machine, and mitigates jams.

SUMMARY

In concordance with the instant disclosure, a wire electrical discharge machining (EDM) system and process that minimizes the opportunity for short circuits, eliminates the need for post-operation machining to remove tabs, minimizes damage to parts and the wire EDM machine, and mitigates jams has been surprisingly discovered.

In one embodiment, a support assembly for wire EDM includes a build plate having a body, a temporary support (or shroud), and at least one layer of a support material. The body has at least one additive manufactured part disposed on the body. The temporary support is removably disposed on the build plate. The temporary support has a hollow body defined by at least one sidewall. The at least one sidewall has a plurality of apertures. The at least one layer of a support material is disposed on the build plate and inside the temporary support.

In a further embodiment, the support assembly may include a method for manufacturing the support assembly for wire EDM. The method has steps including a step of providing a build plate having a body and a temporary support. The body has at least one additive manufactured part disposed on the body. The temporary support has a hollow body defined by at least one sidewall with a plurality of apertures. The method also includes a second step of providing a layering basin with a cavity. Then, the method may have a step of disposing the temporary support on the body of the build plate. The temporary support surrounds the at least one additive manufactured part. Next, the method may include a step of disposing the temporary support and the build plate within the cavity of the layering basin. The method may then have a step of disposing a support material in the hollow body of the layering basin. Lastly, the method may have a step of disposing a chilled fluid in the cavity of the layering basin to solidify the support material and form at least one solid layer of support material for supporting the at least one additive manufactured part within the temporary support. The support assembly is thereby provided.

In an additional embodiment, the support assembly may further include a method for liberating parts using wire EDM. The method may have a step of providing a support assembly and a removal basin. The removal basin has a cavity. The support assembly includes a build plate having a body. The body has at least one additive manufactured part disposed on the body. A temporary support is removably disposed on the build plate. The temporary support has a hollow body defined by at least one sidewall. The at least one sidewall has a plurality of apertures. At least one layer of a support material is disposed on the build plate and inside the temporary support. The method may include a step of affixing the support assembly to a wire EDM machine. Next, the method may have a step of separating, by wire EDM machine, the at least one of additive manufactured part from the build plate. Then, the method may include a step of removing the separated support assembly from the wire EDM machine. Subsequently, the method may have a step of disposing the separated support assembly within the cavity of the removal basin. Lastly, the method may include a step of supplying a hot fluid into the body of the removal basin to liquify the at least one layer of the support material. The at least one additive manufactured part is thereby liberated from the build plate and the at least one layer of the support material.

It should be appreciated that prior art systems have included a build plate, a plurality of additive manufactured parts, a wire EDM machine, and an EDM wire. The plurality of additive manufactured parts are created and affixed to the build plate during an additive manufacturing process, such as direct laser metal sintering (DLMS). To remove the plurality of additive manufactured parts from the build plate, an operator affixes the build plate to a wire EDM machine so the plurality of additive manufactured parts extend out horizontally. This allows the EDM wire to cut across the bases of the plurality of additive manufactured parts, separating the plurality of additive manufactured parts from the build plate.

Since the plurality of additive manufactured parts are not supported in the prior art systems, however, the parts freefall as the parts are separated which may result in part damage and machine damage. Moreover, the EDM machine is unable to do a subsequent passthrough to remove the excess material not cut by the first pass through.

In an exemplary embodiment, as described further herein, a support assembly for wire EDM that mitigates the above-mentioned problems includes a build plate, at least one additive manufactured part, a temporary support, and at least one layer of a support material is surprisingly discovered.

The build plate has a body and includes at least one additive manufactured part disposed across the body. The plurality of additive manufactured parts are made and affixed to the build plate during an additive manufacturing process, such as DLMS.

The temporary support has a hollow body with at least one sidewall. The at least one sidewall has a plurality of spaced apart apertures that allow substances to pass through the hollow body. It should be appreciated that the shape, number of sidewalls, and number of apertures of the temporary support is modifiable within this scope of the disclosure.

The temporary support is configured to be removably disposed on the build plate. In some embodiments, fasteners are used to secure the temporary support to the build plate. It should be appreciated that a skilled artisan may employ any suitable method of disposing the temporary support to the build plate within the scope of the present disclosure.

The at least one layer of the support material is disposed on the build plate and the temporary support. The support material is an expanding medium that solidifies and can be easily removed. In some embodiments the support material is a wax composition. In other embodiments, the wax composition includes a lightweight filler material coated in a conductive material. A non-limiting example of the lightweight filler material may be beads of expanded polystyrene coated in silver. Advantageously, this allows the at least one additive manufactured part to remain electrically grounded during the EDM process.

In some embodiments the support assembly further includes a conductive element. The conductive element is disposed across the build plate, the at least one additive manufactured part, and the temporary support. Advantageously, the conductive element allows the at least one additive manufactured part to remain electrically grounded during the EDM process, absent the support material being conductive. It should be appreciated that the conductive element can be any conductive substance, and a skilled artisan may employ any suitable conductive substances within the scope of the disclosure.

In yet another exemplary embodiment, a method for manufacturing a support assembly for wire EDM includes a first step of providing the build plate, the at least one additive manufactured part, and a layering basin. The layering basin has a hollow body and has a disposing portion that disposes a chilled fluid and the support material. Next, in a second step, the temporary support is disposed on the body of the build plate. Then, in a third step, the temporary support, the at least one additive manufactured part, and the build plate are disposed in the hollow body of the layering basin. Next, in a fourth step, a chilled fluid is disposed in the hollow body of the layering basin. The chilled fluid is disposed at a predetermined volume. The predetermined volume is the level that an operator decides a layer of the support material should be created at. It should be appreciated a skilled artisan may select different predetermined volume values to accommodate different part sizes and types within the scope of this disclosure. Then, in a fifth step, a layer material is disposed in the hollow body of the layering basin. The chilled fluid chills the support material into a solid, forming a solid layer of the support material. It should be appreciated that the fifth step can be repeated to form several solid layers of the support material to accommodate different part sizes and types within the scope of this disclosure. Favorably, the solid layers of the support material firmly hold the at least one additive manufactured part in place during the EDM process.

It should be appreciated that a skilled artisan may employ different distribution methods of disposing the chilled fluid and the support material into the body of the layering basin within the scope of the disclosure In yet a further exemplary embodiment, a method for liberating parts using wire EDM includes the first step of providing the support assembly and a removal basin, not shown. The removal basin includes a hollow body and a disposer portion. The disposer portion disposes a hot fluid. Next, in a second step, the support assembly is affixed to a wire EDM machine. Then, in a third step, the at least one additive manufactured part is separated from the build plate via the wire EDM process. Advantageously, the support material firmly holds the at least one additive manufactured part in place, militating against the part from freefalling. This further allows, the wire EDM process to continue and allows the operator to do consecutive passthroughs to remove any excess metallic residue. Then, in a fourth step, the support assembly is removed from the wire EDM machine. Next, in a fifth step, the support assembly is disposed within the hollow body of the removal basin. Then, in a seventh step, the hot fluid is disposed within the removal basin. The hot fluid melts the solid layers of the support material, removing any excess residue on the at least one additive manufactured part. Beneficially, the support material can be collected and reused in subsequent wire EDM processes. It should be appreciated that a skilled artisan may employ different distribution methods of disposing the hot fluid into the body of the removal basin within the scope of the disclosure.

In the embodiments where the support material is a conductive wax composition, which includes a lightweight material coated in a conductive material, the lightweight material floats to the surface of the hollow body of the removal basin. Advantageously, this allows the lightweight material to be reused as well. It should be appreciated that a skilled artisan may employ different lightweight materials, as long as they float to the surface of the hot fluid (e.g., water), within the scope of the disclosure.

In a most particular embodiment, the disclosure advantageously supports the printed parts in place which mitigates against damage to falling parts, wire impingements or short circuits which causes wire breakage or machine stoppage that requires operator intervention, and crushed parts. Additionally, the support for the printed parts provides the opportunity to complete final finishing processing.

The disclosure may involve using a lightweight, metal temporary support that is attached to the build plate. The disclosure may also have a machine to deposit fixturing wax, in at least one layer, embedding the parts giving the necessary machining support for the many shapes capable with DLMS. The disclosure may use at least one of a non-toxic and biodegradable wax as the support material, that will be easily removed, leaving no contaminating residue. Removal of the support material from the liberated parts may be performed in the machine's removal basin with a hot fluid. The machine may recover the wax and recycle the wax for future reuse.

In a specific example, the disclosure may include a method with a first step of installing a thin ground wire to the at least one additive manufactured part to be removed. A second step of the method may include installing the support fixture and ground wire to the build plate with the at least one additive manufactured part. A third step of the method may be placing the build plate and support fixture in a layering basin with chilling fluid, with the build plate facing a bottom surface of the layering basin. Next, the method may include a fourth step of filling the layering basin with chilled fluid to a level just above the wire EDM path opening. In a fifth step of the method, the method may include pumping a layer molten support material from a preheated tank to a desired level for a support material layer. An operator may decide to make enough layers to give adequate support considering the weight of the parts to be removed. In a seventh step, the method may further include draining the chilled fluid from the layering basin. An operator may remove the support assembly from the layering basin and attach the support assembly to the wire EDM machine, removing the parts by wire EDM process. The results in the support assembly being removed from the build plate. Then, an eighth step of the method may include removing the support assembly from the build plate by either cracking the support layers to remove the parts or utilizing a removal basin.

The removal basin is advantageous if the support material layers are thick and/or if the at least one additive manufactured part is delicate. To utilize the removal basin, an operator may place the separated support assembly into the removal basin. Hot fluid may be supplied to the removal basin, which thereby melts the support material from the at least one additive manufactured part. The melted support material may be collected from the top of the basin for future use. Alternatively, if the at least one additive manufactured part removed by cracking the support layers, the at least one additive manufactured part may be submerged in the removal basin to remove residual support material.

It should be appreciated that a skilled artisan may combined the functions of the layering basin and the removal basin into one singular basin within the scope of the disclosure.

In a most specific example, the disclosure may include the use of a lightweight, conductive aggregate in the wax layers such as small, hard foam beads coated with silver paint or other conductive coatings to eliminate the grounding wire. Also, different layering materials may be substituted such as a foam or other expanding medium that solidifies and can be easily removed after the wire EDM separation.

BRIEF DESCRIPTION OF THE DRAWINGS

The above, as well as other advantages of the present disclosure, will become readily apparent to those skilled in the art from the following detailed description, particularly when considered in the light of the drawings described hereafter.

FIG. 11 is a further flowchart showing the method for manufacturing the support assembly shown in FIG. 10; and FIG. 12 is a flowchart showing a method for liberating the parts from the build plate using the support assembly, according to one embodiment of the disclosure.

DETAILED DESCRIPTION

The following detailed description and appended drawings describe and illustrate various embodiments of the composition. The description and drawings serve to enable one skilled in the art to make and use the composition and are not intended to limit the scope of the composition in any manner. In respect of the methods disclosed, the steps presented are exemplary in nature, and thus, the order of the steps is not necessary or critical unless otherwise disclosed.

Figure 1:
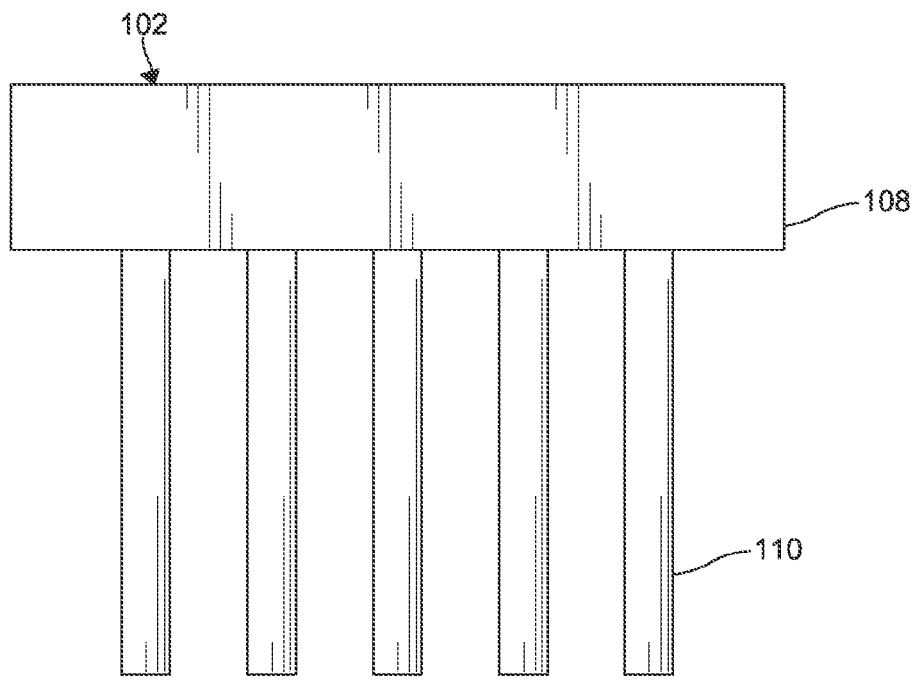
FIG. 1 is a top plan view of a build plate with manufactured parts disposed on the build plate, according to the prior art.
Figure 2:
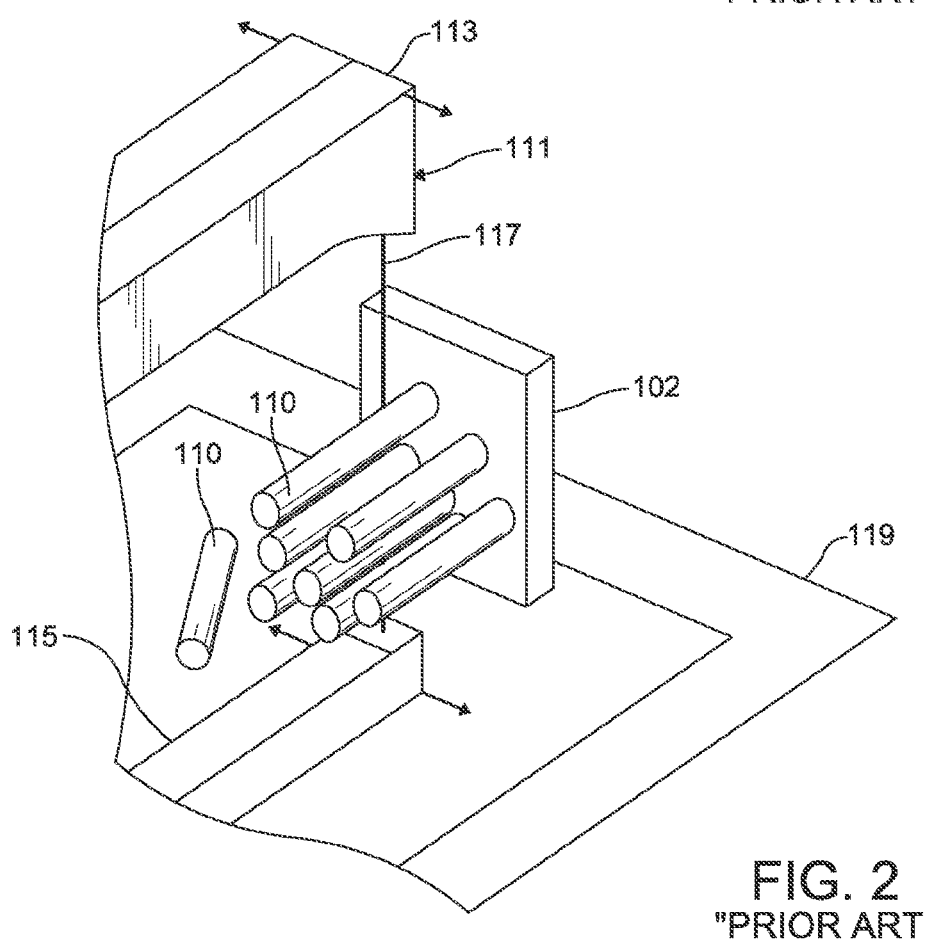
FIG. 2 is a top perspective view of the build plate shown in FIG. 1 affixed to a wire electrical discharge machining (EDM) system, according to the prior art.

For the purpose of illustrating a support assembly 100 of the present disclosure, FIGS. 1-2 show a prior art system without a temporary support 104 and without a support material 106. In FIGS. 1-2, the at least one additive manufactured part 110 is not supported after being separated from a build plate 102, and thus, may be prone to free-falling and potentially being damaged. The at least one additive manufactured part 110 may be separated from the build plate through the use of a wire EDM machine 111. The wire EDM machine may include an upper EDM head 113, a lower EDM head 115, an EDM wire 117, and an EDM machine table 119.

Advantageously, and as shown in FIGS. 3-7, the present disclosure includes a support assembly 100 for wire EDM which may have the build plate 102, a temporary support 104, and at least one layer of the support material 106 disposed on the build plate 102 and inside the temporary support 104. The temporary support 104 and the support material 106 are configured to militate against the at least one additive manufactured part 110 from free-falling and potentially causing damage to both the part 110 and the EDM machine 111.

As further shown in FIGS. 3-7, the build plate 102 has a body 108. The body 108 includes at least one additive manufactured part 110 disposed on the body 108. The temporary support 104 is removably disposed on the build plate 102. The temporary support 104 further includes a hollow body 112 defined by at least one sidewall 114. The at least one sidewall 114 has a plurality of apertures 116.

Figure 5:
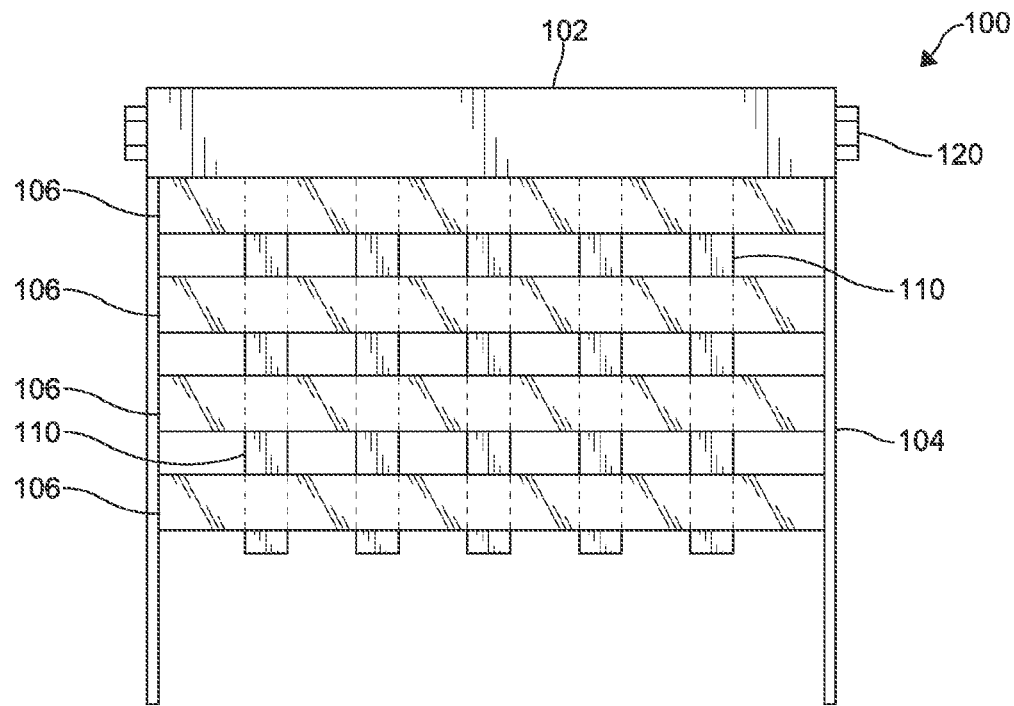
FIG. 5 is a top plan view of the support assembly shown in FIGS. 3A, 3B, and 4.

In a particular embodiment, as shown in FIGS. 3 and 5, the support assembly 100 further includes a conductive element 118 disposed across the build plate 102, the at least one additive manufactured part 110, and the temporary support 104. The temporary support 104 may have at least one sidewall 114, as described further herein.

In a more particular embodiment, the conductive element 118 is a wire. Advantageously, the conductive element 118 militates against the potential risk for short circuits during the wire EDM process. A skilled artisan may select other suitable methods of providing the conductive element 118 across the build plate 102, the at least one additive manufactured part 110, and the temporary support 104, within the scope of the present disclosure.

In another embodiment, the support material 106 is a wax composition. In a specific embodiment, the wax composition may be further defined as a paraffin wax. In a more specific embodiment, the wax composition is a conductive wax composition. The conductive wax composition may include a lightweight filler material coated in a conductive material. In an even more specific embodiment, the lightweight filler material is expanded polystyrene. In a most specific embodiment, the conductive material is silver. Advantageously, the conductive wax composition further militates the potential risk of short circuits and the necessity of additional steps for separately providing a grounding system or restarting the wire EDM process if a short circuit does occur. One skilled in the art may select other suitable materials to support the at least one additive manufactured part 110, and other applicable conductive coating materials, within the scope of the present disclosure.

Figure 3A:
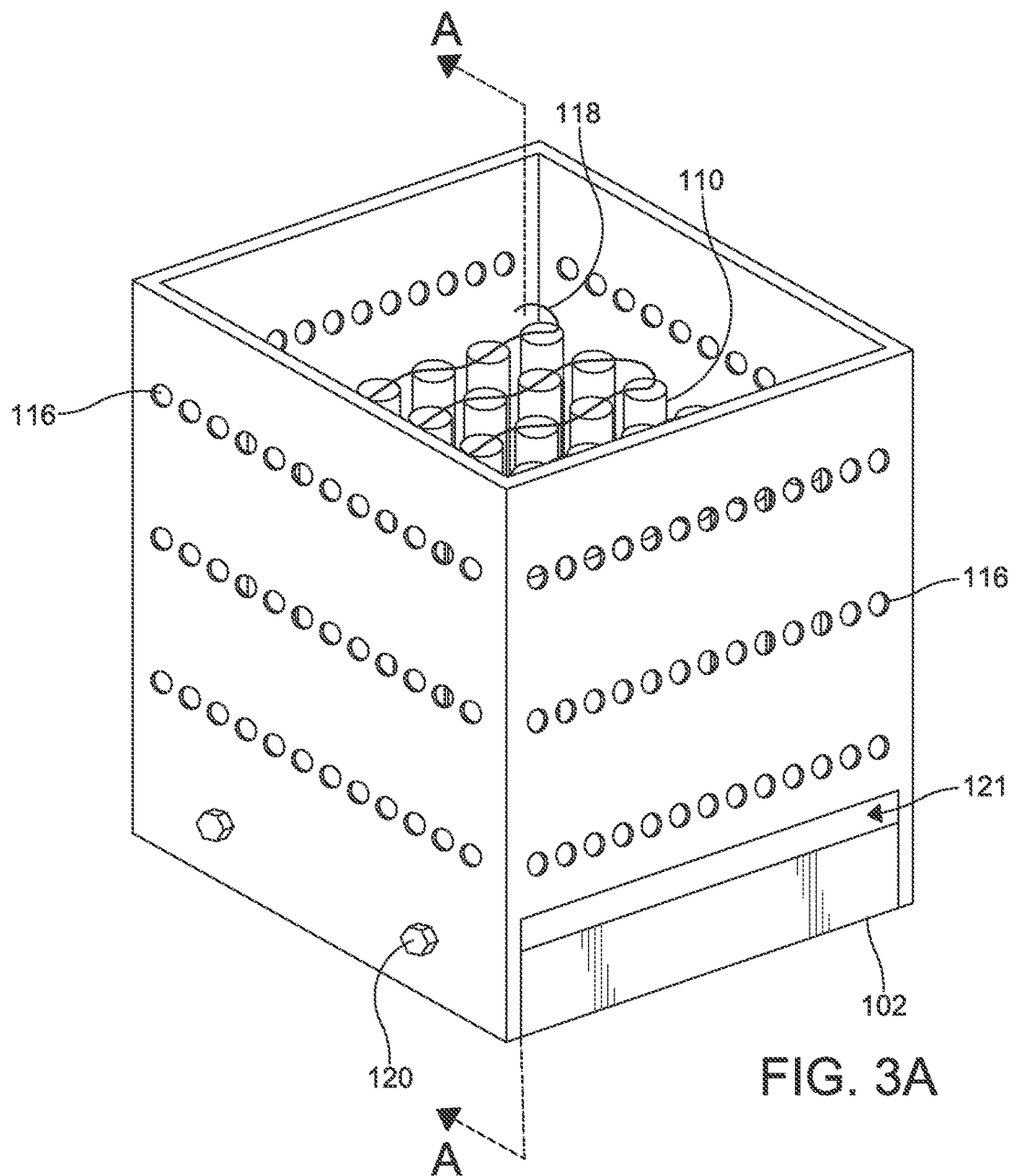
FIG. 3A is a front perspective view of a support assembly according to one embodiment of the disclosure, and further showing the support assembly assembled and including a temporary support and a build plate with additive manufactured parts disposed on the build plate.
Figure 3B:
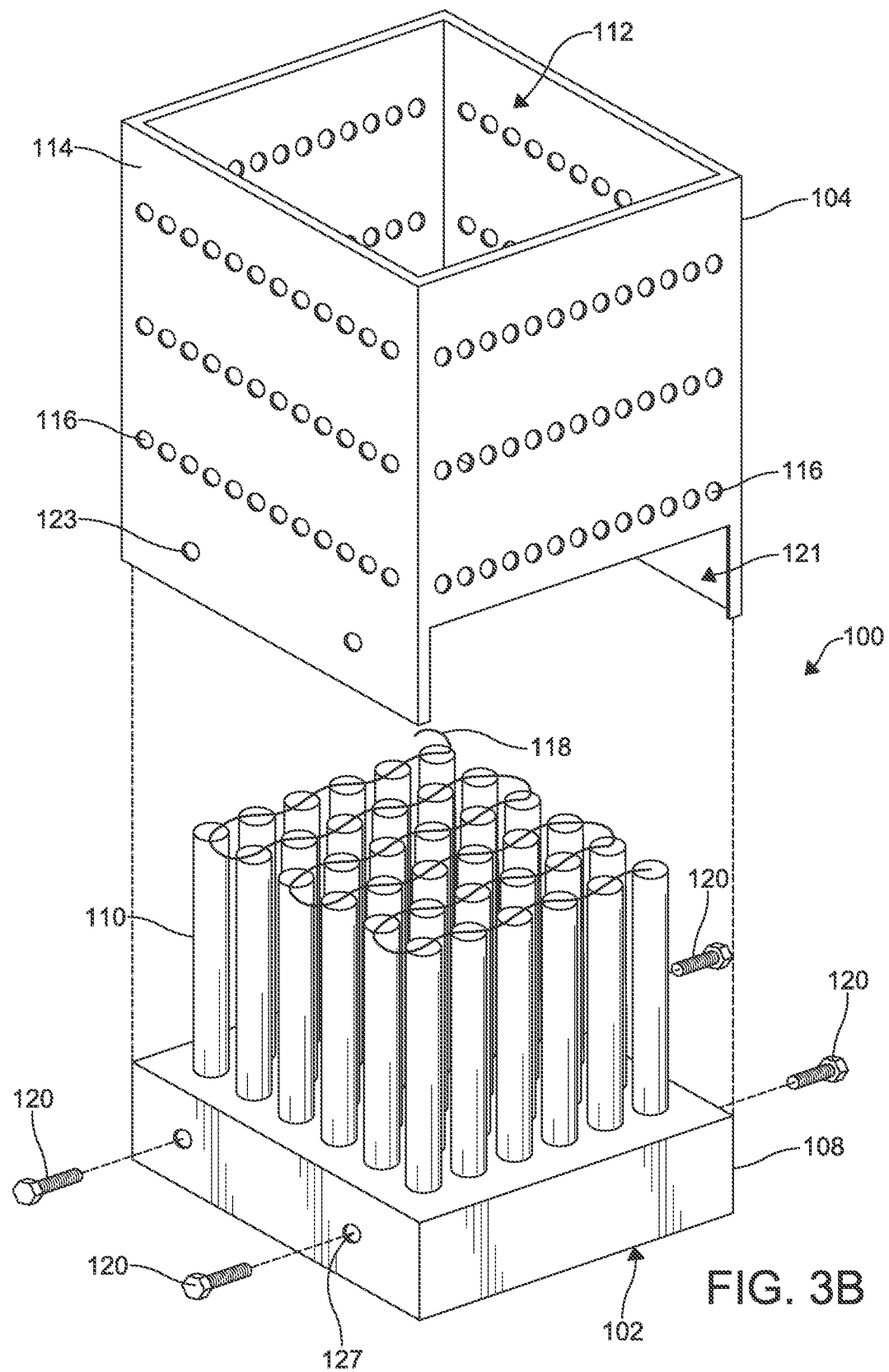
FIG. 3B is an exploded, front perspective view of the support assembly shown in FIG. 3A.

As shown in FIGS. 3A and 3B, the temporary support 104 assembly 100 is removably disposed on the build plate 102 with a mechanical fastener 120. The mechanical fastener 120 may be disposed through at least one hole 123 in the at least one sidewall 114 of the temporary support 104. The mechanical fastener 120 may further be disposed in an opening 127 of the build plate 102. Non-limiting examples of the mechanical fastener 120 include a bolt, screw, or a rivet. Where the mechanical fastener 120 is threaded, it should be appreciated that the opening 127 may have a corresponding threading that permits for a threadable attachment of the mechanical fastener 120. However, a skilled artisan may select other suitable methods of disposing the temporary support 104 assembly 100 to the build plate 102, within the scope of the present disclosure.

Figure 7:
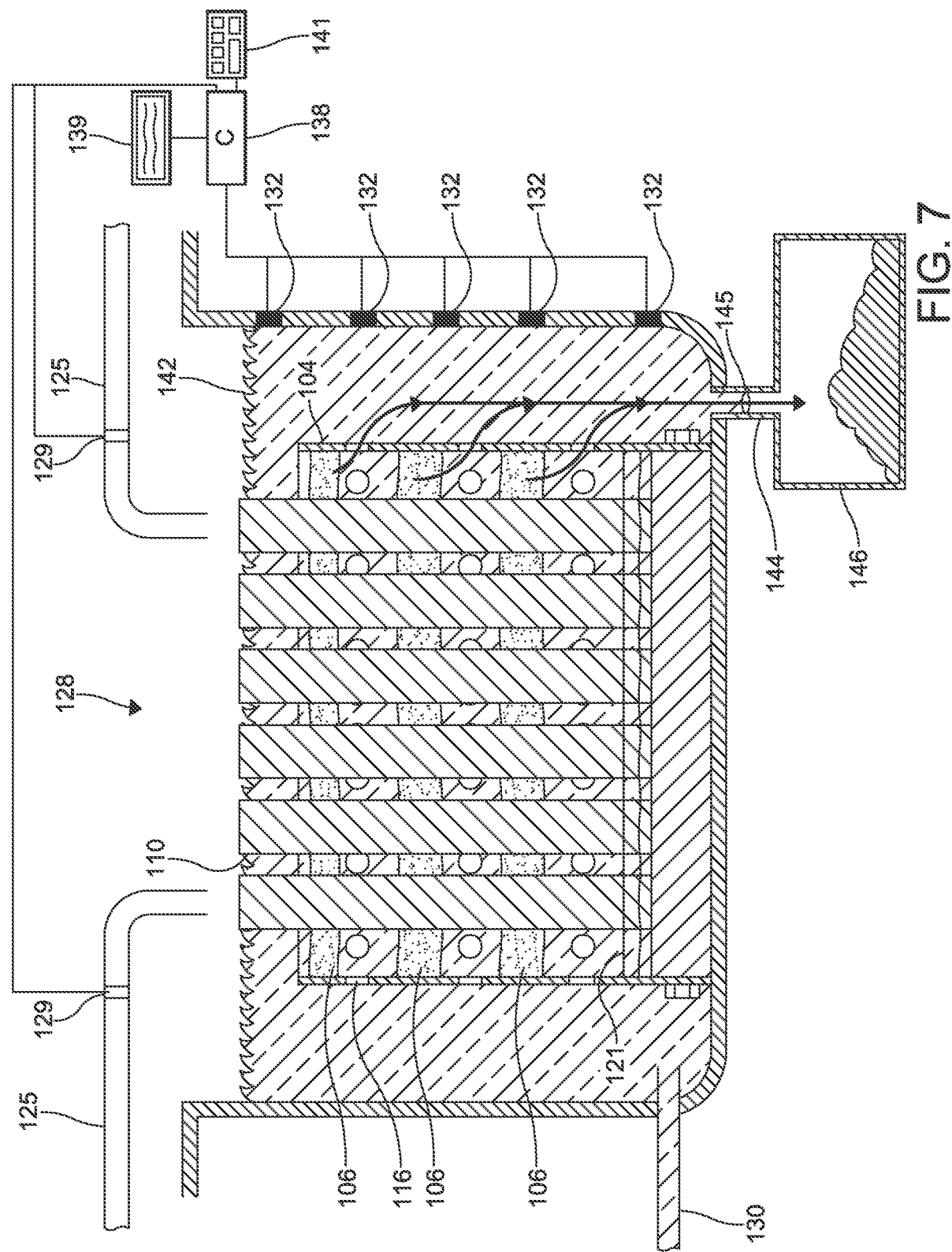
FIG. 7 is a cross-sectional, side elevational view of the support assembly taken at section line A--A in FIG. 3A, and further showing the support assembly disposed in a removal basin following the wire EDM process.

Now in reference to FIGS. 3A, 3B, and 7, the temporary support 104 also has a wire gap 121. The wire gap 121 is an opening between the temporary support 104 and the build plate 102. The wire gap 121 is configured to provide enough space for a wire or a blade to be disposed through. To dispose the wire or the blade through the support material 106 within the wire gap 121, a user may drill an access hole (not shown) through the support material 106 within the wire gap 121. Advantageously, this allows the EDM wire 117 to cut through the support material 106 without cutting through the temporary support 104. Desirably, this also allows the temporary support 104 to be reused.

Figure 10:
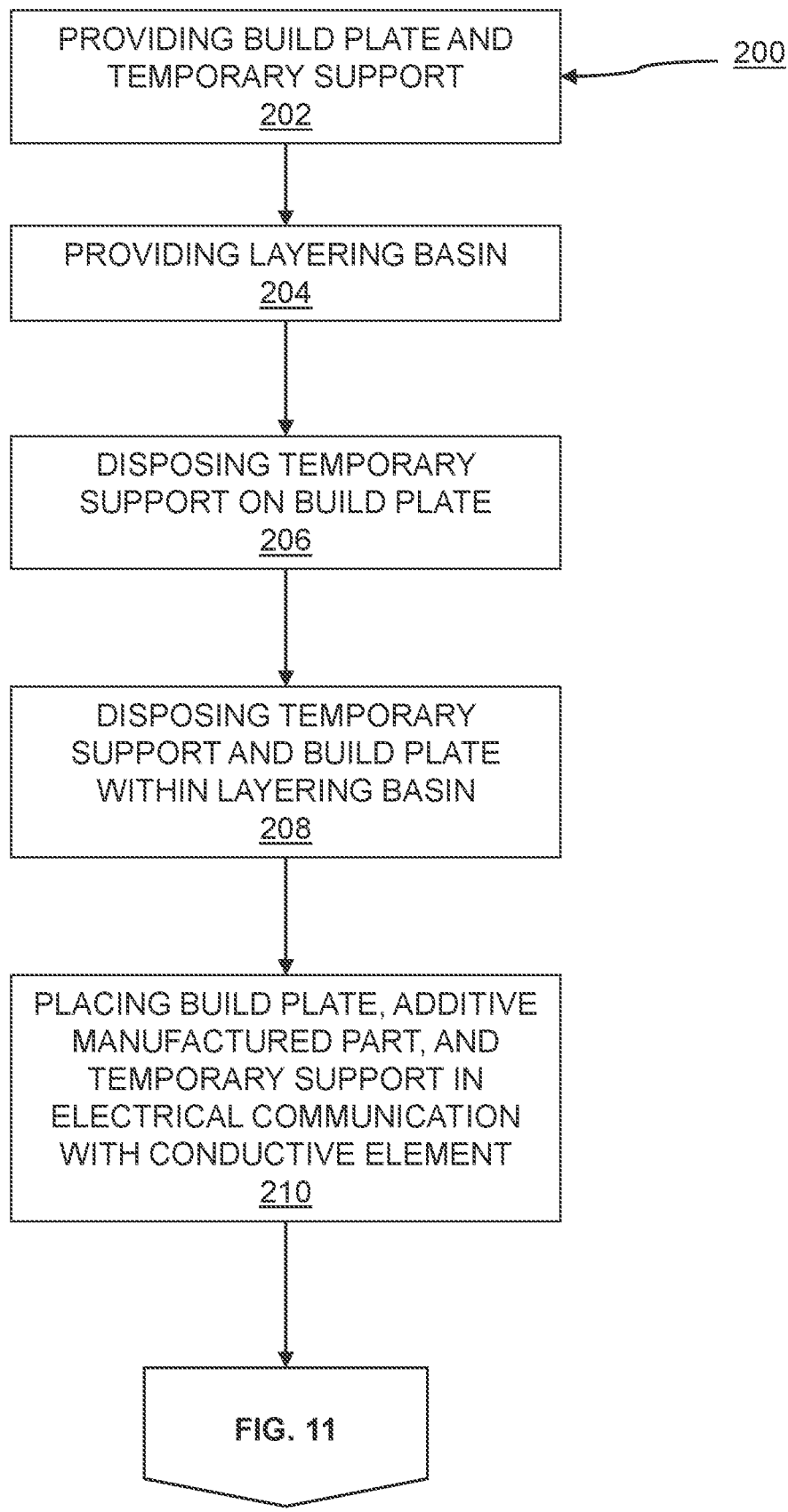
FIG. 10 is a flowchart showing a method for manufacturing the support assembly, according to one embodiment of the disclosure.

In another embodiment of the present disclosure, as shown in FIGS. 3-5 and 10-11, the support assembly 100 may further include a manufacturing method 200 for manufacturing a support assembly 100 for wire EDM. The manufacturing method 200 may include a first step 202 of providing the build plate 102 and a temporary support 104. As described hereinabove, the body 108 has the at least one additive manufactured part 110 disposed on the body 108. The temporary support 104 has the hollow body 112 defined by at least one sidewall 114 and the at least one sidewall 114 has the plurality of apertures 116. Next, as shown in FIG. 10, the manufacturing method 200 may include a second step 204 of providing a layering basin 122 with a cavity 124 (shown in FIG. 4).

Then, as further shown in FIG. 10, a third step 206 of the manufacturing method 200 may include a disposing of the temporary support 104 on the body 108 of the build plate 102. Upon the temporary support 104 being disposed on the build plate 102, the temporary support 104 surrounds the at least one additive manufactured part 110.

Next, in continued reference to FIG. 10, the manufacturing method 200 may include a fourth step 208 of disposing the temporary support 104 and the build plate 102 within the cavity 124 of the layering basin 122.

Subsequently, as shown in FIG. 10, the manufacturing method 200 may further include a fifth step 210 of placing the build plate 102, the at least one additive manufactured part 110, and the temporary support 104 in electrical communication with the conductive element 118. For example, the conductive element 118 may be affixed by welding or through the use of conductive fasteners, as non-limiting examples. Advantageously, as described hereinabove, the conductive element 118 may militate against the potential risk of short circuits.

Next, as shown in FIG. 11, a sixth step 212 of the manufacturing method 200 may include supplying a chilled fluid 126 (shown in FIG. 4) to the cavity 124 of the layering basin 122. Then, as further shown in FIG. 11, a seventh step 214 of the manufacturing method 200 may include a supplying of the support material 106 to the hollow body 112 of the temporary support 104. As described hereinabove, the support material 106 may militate against the at least one additive manufactured part 110 from free-falling after being cut.

With continued reference to FIG. 11, the manufacturing method 200 may include a step 216 of determining whether the layer of the support material 106 has been formed. If the layer has not yet been sufficiently formed, the manufacturing method 200 may involve a step of supplying more of the support material 106 to the temporary support 104 in the seventh step 214. If the layer has been sufficiently formed, the manufacturing method 200 may include step 218 of determining whether another layer of the support material 106 is required to adequately support the at least one additive manufactured part 110? If another layer of the support material 106 is required, then the manufacturing method 200 may include a supplying of more of the chilled fluid 126 to the layering basin 122 in the sixth step 212. If another layer of the support material is not required, meaning that the at least one additive manufactured part 110 is being sufficiently supported, then the manufacturing method 200 may include a final step 220 of removing the manufactured support assembly 100 from the layering basin 122 for delivery to the EDM machine 111.

Figure 4:
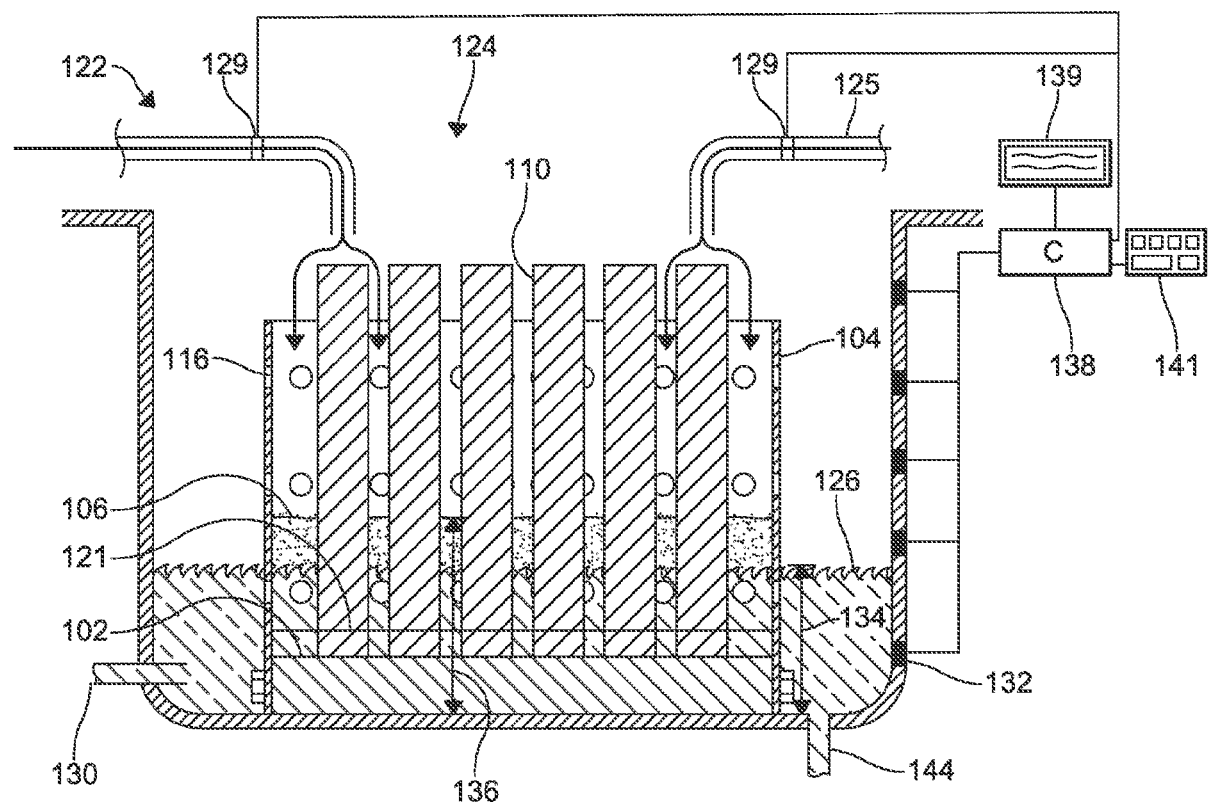
FIG. 4 is a cross-sectional, side elevational view of the support assembly taken at section line A--A in FIG. 3A, and further showing the support assembly disposed in a layering basin prior to a wire EDM process.

In a particular embodiment, as shown in FIG. 4, the support material 106 may be supplied to the hollow body 112 of the temporary support 104 through at least one deposit tube 125. The at least one deposit tube 125 may be disposed above or adjacent an upper opening of the layer basin 122, for example. The at least one deposit tube 125 may be selectively opened through the use of a spigot 129 disposed on the deposit tube 125. In a specific example, the at least one deposit tube 125 may be a copper deposit tube. One skilled in the art may select other suitable materials and methods to supply the support material 106 to the hollow body 112 of the temporary support 104.

In an additional embodiment, the layering basin 122 may be configured to also be used as a removal basin 128 for a liberating method 300 for liberating the at least one additive manufactured part 110 from the build plate 102 and the temporary support 104, as described further herein.

With reference to the sixth step 212 of the manufacturing method 200, the chilled fluid 126 may have a predetermined temperature. The predetermined temperature will be selected by the skilled artisan so as to be high enough to permit for the flow and complete distribution of the support material 106 upon being deposited in liquid form into the layer basin 122, but low enough to permit for a timely solidification of the support material 106 to form the supporting layer or layers. In particular, the predetermined temperature may be necessary to solidify the support material 106 and to form at least one solid layer of the support material 106 to securely hold the at least one additive manufactured part 110 within the temporary support 104 during the EDM process.

The chilled fluid 126 may have a predetermined temperature that is slightly less than the melting temperature of the support material 106. For example, the predetermined temperature of the chilled fluid 126 may be within twenty degrees Fahrenheit (20° F.) less than a melting temperature of the support material 106. In an even more specific example, the chilled fluid 126 may have a predetermined temperature within five degrees Fahrenheit (5° F.) less than the melting temperature of the support material 106.

Advantageously, the temperature of the chilled fluid 126 within twenty degrees Fahrenheit (20° F.) less than the melting temperature of the support material 106 will allow the support material 106 to flow into a substantially even layer before solidifying. One skilled in the art may select other suitable temperatures to solidify the at least one layer of support material 106, for example, depending on the melting temperature and viscosity of the support material 106, as desired.

In particular, where the support material 106 is paraffin wax, the chilled fluid 126 may have a predetermined temperature between sixty seven degrees Fahrenheit (67° F.) and one-hundred twenty five degrees Fahrenheit (125° F.), and more particularly between about one-hundred degrees Fahrenheit (100° F.) and about one-hundred-and-five degrees Fahrenheit (105° F.). It should be appreciated that the predetermined temperature is not more than one-hundred twenty five degrees Fahrenheit (125° F.) so as to permit for the timely solidification of the support material 106 where the paraffin wax is employed.

As shown in FIG. 4, the layering basin 122 may further have an inlet pipe 130. The inlet pipe 130 may be disposed adjacent a bottom of the layer basin 122, for example. The sixth step 212 of supplying the chilled fluid 126 to the cavity 124 of the layering basin 122 may include supplying the chilled fluid 126 through the inlet pipe 130.

As shown in FIGS. 4 and 7, in a particular embodiment, the layering basin 122 may include at least one sensor 132. The at least one sensor 132 may be in electrical communication with a control computer system 138. The computer system 138 may include a computer display 139 and an interface 141. The computer display 139 and the interface 141 may be configured to allow a user to control the control computer system 138 while manufacturing the support assembly 100.

In a more particular embodiment, the control computer system 138 may have an autonomous feature or semi-autonomous feature to manufacture the support assembly 100 with limited user interaction. For example, the control computer system 128 may have a processor and a memory having non-transitory processor-executable instructions that are tangibly embodied thereon for the automated operation of the methods 200, 300 as described herein.

In an even more particular embodiment, as further shown in FIG. 4, the chilled fluid 126 may have a chilled fluid depth 134 and the support material 106 may have a vertical position 136 above a base of the layering basin 122. In addition, the at least one sensor 132 may monitor and measure the chilled fluid depth 134. The at least one sensor 132 may be a laser beam sensor, for example. Other suitable types of sensors for monitoring the chilled fluid depth 134 may also be employed. The formation of each layer of the support material 106 may be monitored visually, such as by an automated visual monitoring system or other suitable sensors (not shown). One skilled in the art may also select other suitable methods of monitoring the chilled fluid depth 134 and the vertical position 136 of the at least one layer of the support material 106, within the scope of the present disclosure.

Figure 6:
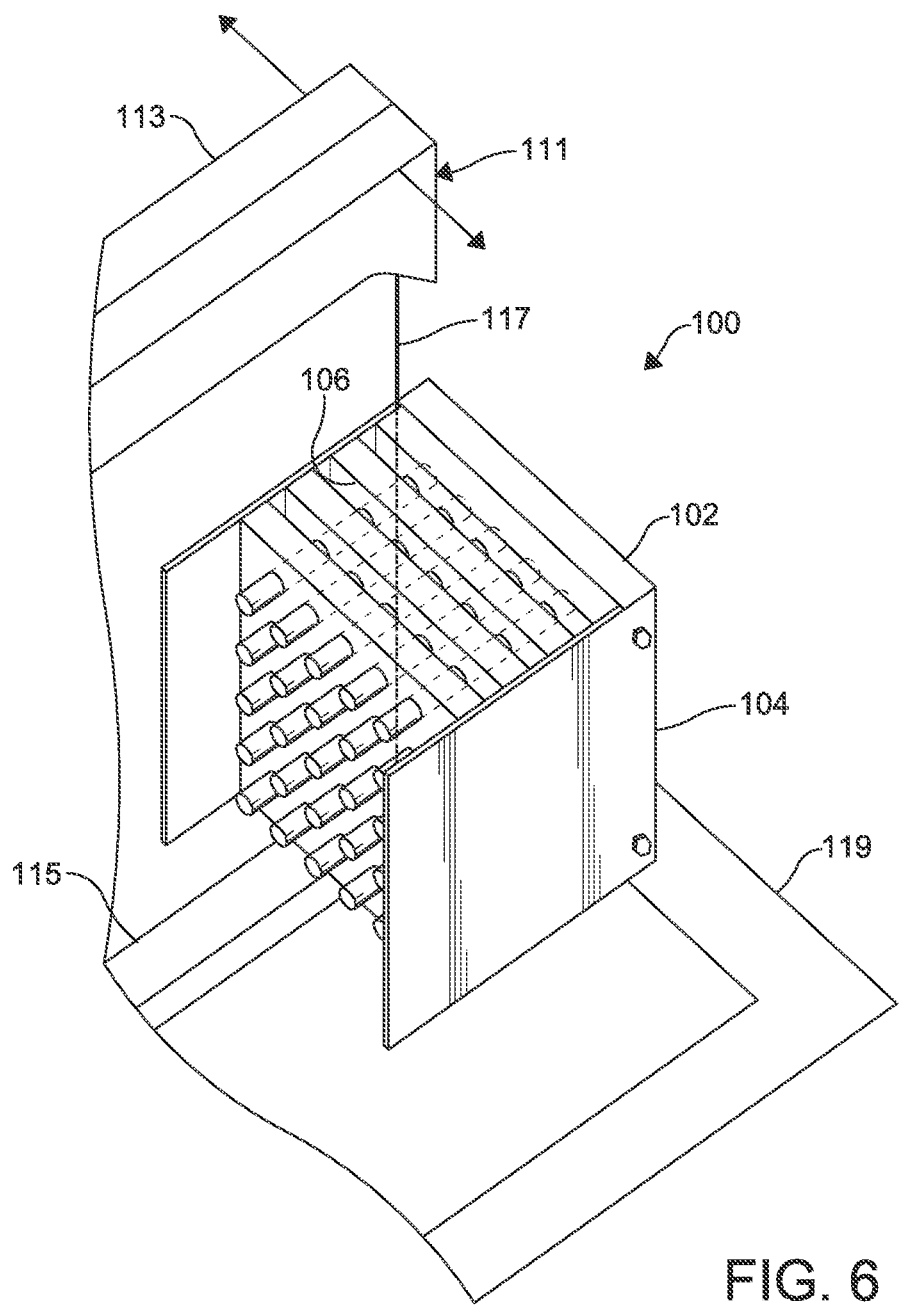
FIG. 6 is top perspective view of the support assembly of FIGS. 3A, 3B, 4, and 5, and further showing the support assembly affixed to a wire EDM system.

As shown in FIGS. 5-6, in a specific example, the layers of the support material 106 may be spaced apart. The spacing between each layer of the support material 106 may be formed by supplying chilled fluid 126 to the layering basin 122 where the chilled fluid depth 134 may be greater than the vertical position 136. Afterwards, the seventh step 214 of the method 200 may be repeated to form an additional layer of the support material 106.

In particular, and as shown in FIG. 4, the support material 106 may be configured to float on a top surface of the chilled fluid 126 during the manufacturing of the support assembly 100. The chilled fluid 126 thereby creates a gap between adjacent layers of the support material 106. As the additional layer of the support material 106 is supplied to the temporary support 104, the additional layer of support material 106 mechanically adheres to at least one of the temporary support 104 and the at least one additive manufactured part 110 as the support material 106 solidifies, thereby supporting the additional layer of support material 106 in a desired position. It should be appreciated that the mechanical attachment allows the chilled fluid 126 level to be raised above the solidified layer of support material 106, which would otherwise float atop the chilled fluid 126, and for subsequent layers of the support material 106 to be formed as described herein.

Advantageously, the gap between the layers of the support material 106 provides the option to selectively place the layers of the support material 106 only where the support is most needed. Desirably, the gaps between the layers of the support material 106 may reduce the cost, weight, and time required to fill the entirety of the support assembly 100 with the layers of the support material 106.

In another embodiment of the present disclosure, as shown in FIGS. 5-7 and FIG. 12, the support assembly 100 may further include the liberating method 300 for liberating parts using wire EDM. The liberating method 300 may include a step 302 of providing the support assembly 100, which includes the build plate 102, the temporary support 104, and the at least one layer of a support material 106, for example, as manufactured according to the method 200 described hereinabove. Next, a second step 304 of the liberating method 300 may include providing the removal basin 128 with the cavity 124.

Then, as shown in FIG. 6, the liberating method 300 may include a third step 306 of affixing the support assembly 100 to the wire EDM machine 111. A fourth step 308 of the liberating method 300 may include separating, by the wire EDM machine 111, the at least one of additive manufactured part 110 from the build plate 102, thereby providing the support assembly 100 including the at least one additive manufactured part 110 being separated from the base plate 102, also referred to herein as the "separated support assembly" 100.

Next, the liberating method 300 may further include a fifth step 310 of removing the separated support assembly 100 from the wire EDM machine 111. Then, a sixth step 312 of the liberating method 300 may include disposing the separated support assembly 100 within the cavity 124 of the removal basin 128.

Lastly, the liberating method 300 may include a seventh step 314 of supplying a hot fluid 142 to the cavity 124 of removal basin 128 to liquify the at least one layer of the support material 106, whereby the at least one additive manufactured part 110 is liberated from the temporary support 104 and the support material 106. Advantageously, as described hereinbelow, the liquified support material 106 may be collected and reused.

In a specific embodiment, the removal basin 128 may also be the layering basin 122 configured for use in the manufacturing method 200 for manufacturing the support assembly 100.

In a particular example, the hot fluid 142 may further be defined as having a temperature between one hundred degrees Fahrenheit (100° F.) and two hundred degrees Fahrenheit (200° F.).

As shown in FIG. 7, in a specific example, the removal basin 128 may have a drain 144 in fluid communication with a collection bin 146. The drain 144 may be formed in a base of the removal basin 128, for example. The drain 144 may be selectively opened with a valve 145 disposed on the drain 144. The liberating method 300 may further include an eighth step 316 of draining the hot fluid 142 with the support material 106 that has been liquified through the drain 144 and to the collection bin 146 for reuse. The draining may be performed under force of gravity or may be facilitated by use of a pump (not shown), as non-limiting examples.

In an alternative embodiment, to collect the melted support material 106, an operator may recover any melted support material 106 from a top surface of the hot fluid 142. The removal of melted support material 106 from the top surface of the hot fluid 142 may be completed by skimming with at least one of a net (not shown) or a filter (not shown), as non-limiting examples. One skilled in the art may select other suitable methods for collecting the melted support material 106 for reuse, within the scope of the present disclosure.

Figure 8:
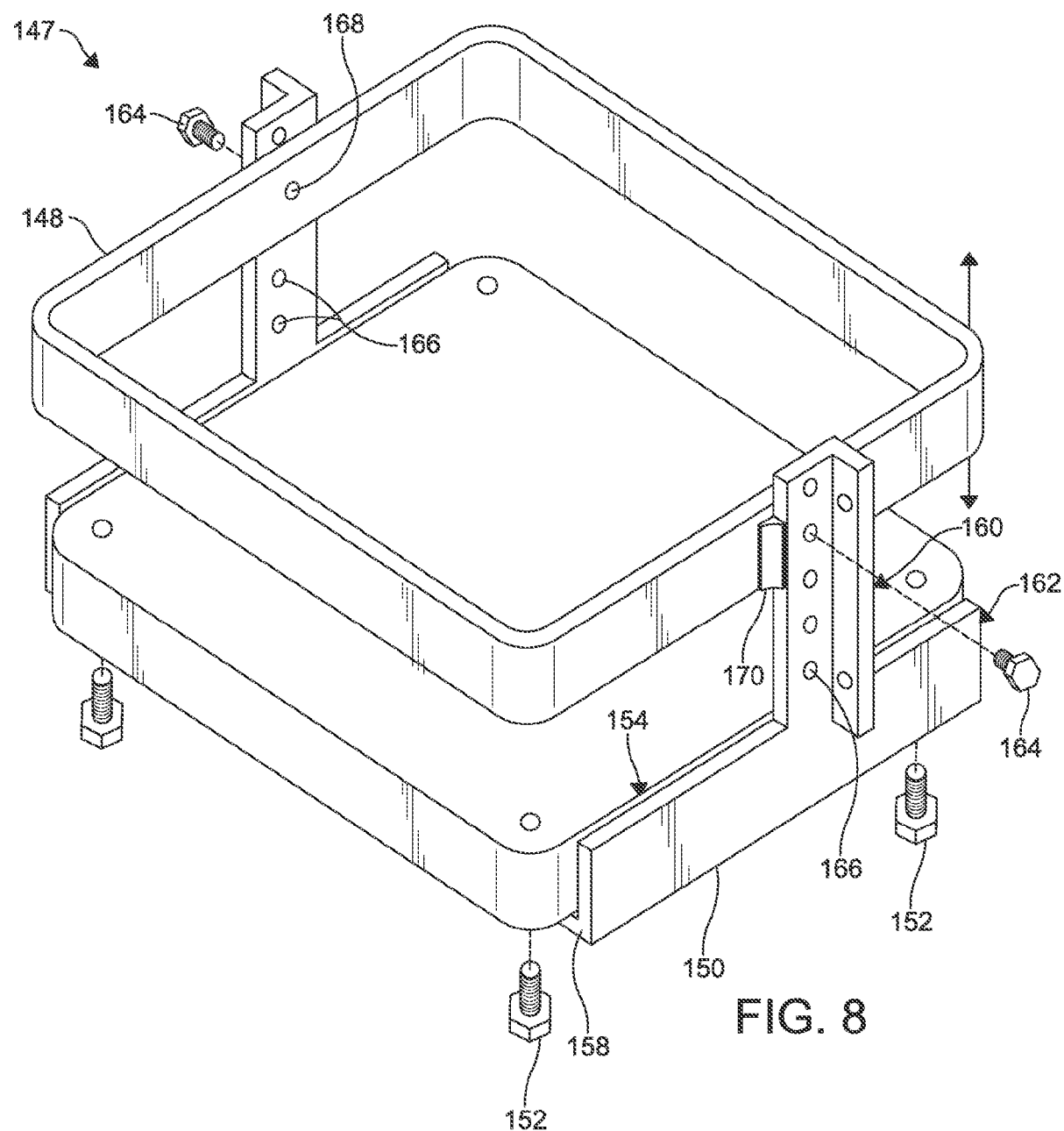
FIG. 8 is a front perspective view of a support assembly according to another embodiment of the disclosure, and further showing the support assembly as an assembled support ring system including a height adjustable support ring, a support ring bracket, and a build plate, the build plate also shown without the at least one additive manufactured part for purpose of clarity.
Figure 9:
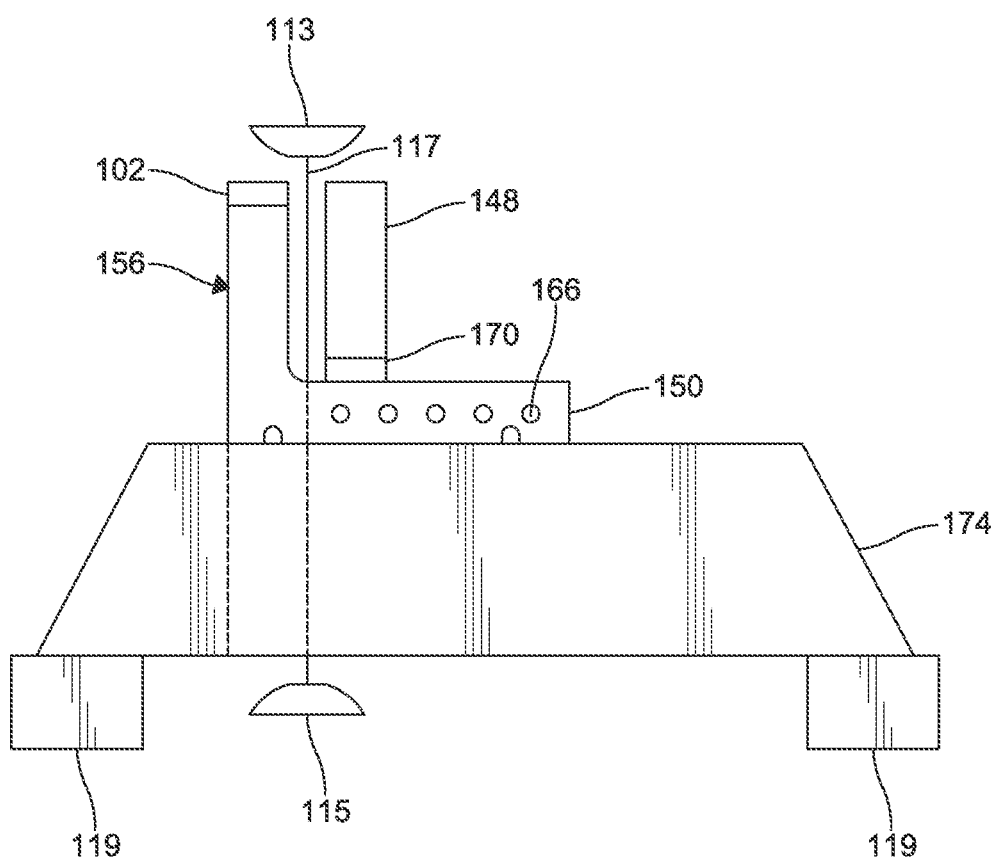
FIG. 9 is a side elevational view of the support assembly in FIG. 8, and further showing the support assembly disposed on the EDM machine table, during a wire EDM process, and the build plate also shown without the at least one additive manufactured part for purpose of clarity.

In another alternative embodiment, as shown in FIGS. 8-9, the temporary support 104 may be provided in the form of a support ring system 147. The support ring system 147 may include at least one support ring 148, a support ring bracket 150, and a build plate 102. The support ring system 147, as shown in FIG. 8 for simplicity, may have only one support ring 148. However, it should be appreciated that a plurality of support rings 148 (not shown) may be used to form a plurality of layers of the support material 106. Advantageously, the at least one support ring 148 and the support ring bracket 150 may provide the necessary support to form the layers of the support material 106, while also minimizing a total weight of the support assembly 100 upon being manufactured, for example, according to the method 200.

The support ring bracket 150 may be disposed on the build plate 102 through the use of mechanical fasteners 152. As a nonlimiting example, the mechanical fasteners 152 may be bracket bolts 152. The bracket bolts 152 may be attached to at least one of the plate sidewalls 154 of the build plate 102 and a bottom wall 156 of the build plate 102. Where the bracket bolts 152 are attached to the bottom wall 156 of the build plate 102, the support ring bracket 150 may have an L-shaped bracket 158 near a bottom edge of the support ring bracket 150.

The support ring bracket 150 may further include a plurality of arms 160 extending upwardly from a base 162 of the support ring bracket 150. The at least one support ring 148 may be disposed on the plurality of arms 160 of the support ring bracket 150 through the use of at least one height adjustment fastener 164. The plurality of arms 160 may further include a plurality of height adjustment apertures 166. The at least one support ring 148 may have at least one height adjustment fastener hole 168. The at least one support ring 148 may be selectively placed at a desired location on the arms 160 by disposing the at least one height adjustment fastener 164 through the at least one height adjustment fastener hole 168 at the desired location along the arms 160. Advantageously, the plurality of height adjustment apertures 166 allows for the vertical position 136 of the support material 106 layers to be selectively manufactured, while also reducing the overall weight of the temporary support 104.

As shown in FIG. 8, in a specific example, the at least one support ring 148 may further include a block 170 disposed adjacently to at least one of the plurality of arms 160. The block 170 is configured to militate against the at least one support ring 148 undesirably rotating about the at least one height adjustment fastener 164 in operation. Advantageously, the block 170 also may contribute to a greater structural integrity of the at least one support ring 148. One skilled in the art may use other methods of militating against the at least one support ring 148 undesirably rotating, including the employment of additional or different types of the at least one height adjustment fastener 164, within the scope of the present disclosure.

In operation, as shown in FIGS. 8-9, the assembled support ring system 147 may be disposed on a fixture support 174. The fixture support 174 may be further mounted to the EDM machine table 119. The assembled support ring system 147 may then be disposed with the plurality of arms 160 extending substantially parallel with the EDM machine table 176. The at least one additive manufactured part 110 (not shown in FIGS. 8 and 9) of the support assembly 100 manufactured using the support ring system 147 may then be cut by the use of the wire EDM machine 111.

Advantageously, the support assembly 100 and methods 200, 300 militate against an opportunity for short circuits in the wire EDM machining process, the need for post-operation machining to remove tabs, damage to the at least one additive manufactured part 110 and the EDM machine 111, and jams, which are all prevalent issues with the prior art as shown in FIGS. 1-2.

While certain representative embodiments and details have been shown for purposes of illustrating the invention, it will be apparent to those skilled in the art that various changes may be made without departing from the scope of the disclosure, which is further described in the following appended claims.

What is claimed is:

1. A support assembly for wire EDM, comprising:
a build plate having a body, the body having at least one additive manufactured part disposed on the body;
a temporary support removably disposed on the build plate, the temporary support having a hollow body defined by at least one sidewall, the at least one sidewall having a plurality of spaced apart apertures;
at least one layer of a support material selectively disposed on the build plate and inside the temporary support; and
a conductive element disposed across the build plate, the at least one additive manufactured part, and the temporary support,
wherein the support material is a wax composition, and
wherein the wax composition is a conductive wax composition, the conductive wax composition including a lightweight filler material coated in a conductive material.

2. The support assembly of claim 1, wherein the conductive element is a wire.

3. The support assembly of claim 1, wherein the lightweight filler material is expanded polystyrene.

4. The support assembly of claim 1, wherein the conductive material is silver.

5. The support of claim 1, wherein the temporary support is removably disposed on the build plate with a mechanical fastener.

6. The support assembly of claim 1, wherein the temporary support is a box having the plurality of apertures disposed in at least one row between a top and a bottom of the sidewall.

7. The support assembly of claim 1, further comprising of a hollow layering basin with a cavity, wherein the temporary support and the build plate are disposed within the cavity.

8. The support assembly of claim 7, further comprising of a chilled fluid disposed in the cavity of the hollow layering basin, the chilled fluid disposed between the at least one layer of support material.

9. The support assembly of claim 7, wherein the hollow layering basin is also a removal basin coupled to a drain, the drain in fluid communication with a collection bin.

10. The support assembly of claim 9, further comprising a hot fluid disposed in the removal basin.

11. The support assembly of claim 10, further comprising of at least one sensor in communication with a control computer system in the hollow layering basin, the sensor measuring a depth of the chilled fluid.

12. The support assembly of claim 1, wherein the support material is composed of biodegradable fixturing wax.

13. The support assembly of claim 1, wherein the temporary support is composed of a lightweight metallic material.

14. The support assembly of claim 1, wherein the temporary support contains a wire gap opening positioned between a lower end of the temporary support and the build plate.

* * * * *